US007512989B2

(12) United States Patent
Scott

(10) Patent No.: US 7,512,989 B2
(45) Date of Patent: *Mar. 31, 2009

(54) DATA LOADER USING LOCATION IDENTITY TO PROVIDE SECURE COMMUNICATION OF DATA TO RECIPIENT DEVICES

(75) Inventor: Logan Scott, Breckenridge, CO (US)

(73) Assignee: Geocodex LLC, Encino, CA (US)

( * ) Notice: Subject to any disclaimer, the term of this patent is extended or adjusted under 35 U.S.C. 154(b) by 661 days.

This patent is subject to a terminal disclaimer.

(21) Appl. No.: 10/278,488

(22) Filed: Oct. 22, 2002

(65) Prior Publication Data

US 2004/0078594 A1 Apr. 22, 2004

(51) Int. Cl.
*G06F 7/04* (2006.01)
*H04L 9/32* (2006.01)
*H04L 9/08* (2006.01)

(52) U.S. Cl. .................. 726/30; 380/284; 713/168
(58) Field of Classification Search ................ 713/168; 726/30; 380/284
See application file for complete search history.

(56) References Cited

U.S. PATENT DOCUMENTS

| | | | | |
|---|---|---|---|---|
| 5,243,652 | A | * | 9/1993 | Teare et al. ................. 380/250 |
| H1414 | H | | 2/1995 | Borgen |
| 5,610,839 | A | | 3/1997 | Karolak et al. |
| 5,621,793 | A | * | 4/1997 | Bednarek et al. ............ 380/240 |
| 5,701,828 | A | | 12/1997 | Benore et al. |
| 5,802,275 | A | * | 9/1998 | Blonder ....................... 726/23 |
| 5,822,430 | A | | 10/1998 | Doud |
| 5,841,026 | A | * | 11/1998 | Kirk et al. .................. 73/178 R |
| 5,870,134 | A | * | 2/1999 | Laubach et al. ............. 725/123 |
| 6,041,123 | A | * | 3/2000 | Colvin, Sr. .................. 713/153 |
| 6,219,789 | B1 | * | 4/2001 | Little et al. .................... 726/34 |
| 6,331,825 | B1 | * | 12/2001 | Ladner et al. ............... 340/988 |
| 6,564,996 | B2 | * | 5/2003 | Hoffman et al. ............. 235/379 |
| 6,948,062 | B1 | * | 9/2005 | Clapper ....................... 713/162 |
| 7,143,289 | B2 | * | 11/2006 | Denning et al. ............. 713/168 |
| 2002/0136407 | A1 | * | 9/2002 | Denning et al. ............. 380/258 |
| 2003/0216143 | A1 | * | 11/2003 | Roese et al. ............. 455/456.1 |

FOREIGN PATENT DOCUMENTS

GB 2348573 A * 10/2000
WO WO 0106787 A * 1/2001

* cited by examiner

*Primary Examiner*—Matthew B Smithers
*Assistant Examiner*—Michael Pyzocha
(74) *Attorney, Agent, or Firm*—O'Melveny & Myers LLP

(57) ABSTRACT

A data loader device is used to convey digital data in a secure manner to another device. The data loader may be fixed (referred to as a Class_A loader) or portable (referred to as a Class_B loader). The data loader encrypts the digital data using a location-identity that permits the digital data to be transferred only if the data loader is disposed at an appropriate location. The fixed data loader remains in a stationary location, and a device to be loaded is brought to the data loader for loading. The portable data loader can be loaded by the fixed data loader, and then transported to another location to load a recipient device. The digital data that is conveyed is unrestricted in nature, and can include keys, navigational information, watermarking parameters, or any other digital content requiring secure delivery. In an embodiment, the data loader device includes a "no-move" system that precludes compromise of data contained therein if the data loader device is moved. Upon detection of movement above a predefined threshold level, the "no-move" system produces an alarm condition that inhibits operation of the device.

39 Claims, 5 Drawing Sheets

DATA LOADER USING LOCATION IDENTITY TO PROVIDE SECURE COMMUNICATION OF DATA TO RECIPIENT DEVICES

BACKGROUND OF THE INVENTION

1. Field of the Invention

The present invention is directed to controlling access to digital data, and more particularly, to a system for providing secure communication of information to recipient devices in a manner such that the information can only be communicated or accessed at specified locations.

2. Description of Related Art

Rapid advances in computer, telecommunications and networking technology have enabled new opportunities and applications that were impossible just a few years ago. These advances are exemplified by the rapid growth of network systems seeking to deliver "high-value" content securely to authorized recipients. Examples of such networks include those that handle confidential, sensitive, or classified information in the health care, financial, and national security fields. They also include networks that handle intellectual property or copyrighted data such as computer software, literary works, and entertainment products. A fundamental aspect of these networks is the sharing of information between users, nodes and components of the network. But, whenever information is shared there is also the risk that the information will be obtained by unauthorized persons. Controlling the security of the information in such systems, including confidentiality, authenticity, integrity, authorized use, transaction secrecy, site protection, etc., has therefore proven to be a critical aspect of such networks.

One technology that is commonly used to protect information on these networks is cryptography. Cryptography is the use of codes and ciphers to protect data from unintended disclosure or modification. It is primarily used to control access to communications transmitted over open networks, but may also be used to control access to stored data. In a transmission utilizing cryptography to protect digital data, the sender converts the original data, or "plaintext," into a coded equivalent called "ciphertext" using an encryption algorithm. The ciphertext is then decoded (or decrypted) by the receiver and thereby turned back into plaintext. The encryption algorithm uses a key, which in digital systems is a string of bits. In general, the larger the number of bits in the key, the longer it takes to break the code using so-called "brute force" methods.

A drawback of conventional cryptographic systems is the inherent risk in distributing keys to recipients of encrypted information. If an unauthorized user intercepts the keys, then that unauthorized user could gain access to the encrypted information. Within military systems, a portable hardware device known as a loader or fill device is often used to transfer confidential information, such as encryption/decryption keys and other mission critical information. The loader/fill device typically includes an electronic memory in which the confidential information may be stored. The loader can be electrically or optically connected directly to a recipient device, such as a satellite receiver, in order to load the confidential information directly into the recipient device. The use of a direct electrical or optical connection between the loader and the recipient device, such as via a cable or shielded connector, precludes radio frequency (RF) broadcasts that can be intercepted. The security of the communication network therefore depends on the physical control over the loader. If the loader were to be misplaced or misappropriated, then the security of the entire communication network could be compromised.

Co-pending patent application Ser. No. 09/992,378, filed Nov. 16, 2001, for SYSTEM AND METHOD FOR DELIVERING ENCRYPTED INFORMATION IN A COMMUNICATION NETWORK USING LOCATION IDENTITY AND KEY TABLES, discloses a system for controlling access to data based not only on a secret key, but also on location. For example, in the context of digital cinema, such a system would enable a producer of digital movies to be assured that its products could only be decrypted in certain theaters whose locations are known in advance. Or, a provider of entertainment products such as movies and subscription television would be assured that its products could only be decrypted within the premises of its customers or within a particular geographic region. This capability would guard against many threats, including the unauthorized distribution of copyright-protected works over the Internet or through other means. Even if the keys were compromised, recipients would not be at the proper location to enable decryption.

Accordingly, it would be desirable to provide a system for providing secure communication of information to recipient devices in a manner such that the information can only be communicated or accessed at specified locations. It would also be desirable to provide a system to protect a device containing critical information, such as encryption/decryption keys, and that would render the critical information unusable to unauthorized persons if the device were misappropriated.

SUMMARY OF THE INVENTION

The present invention overcomes these and other drawbacks of the prior art by providing a data loader device used to convey digital data in a secure manner to another device. The data loader may be fixed (referred to as a Class_A loader) or portable (referred to as a Class_B loader). The Class_A loader remains in a stationary location, and a device to be loaded is brought to it for loading. The Class_B loader can be loaded by the Class_A loader, and then transported to another location to load a recipient device. The data loader encrypts the digital data using a location-identity that permits the digital data to be transferred only if the data loader is disposed at an appropriate location. The digital data that is conveyed is unrestricted in nature, and can include keys, navigational information, watermarking parameters, or any other digital content requiring secure delivery.

In an embodiment of the invention, a Class_A data loader comprises a service profile containing customer location information and original data to be distributed to at least one customer, and a fill data generator adapted to generate fill data based on the original data and transfer the fill data to a recipient device. Exemplary recipient devices may include set-top-boxes used for decoding cable television content, military vehicles needing keys and mission profile data to perform their missions, secure computing facilities using location-based cipher functions to access and communicate secure content, and the like. The service profile determines what information is to be conveyed to a customer. For example, if the recipient device is a cable set-top-box, the service profile may contain information identifying which television programming options the customer has ordered. The Class_A loader would then generate fill data containing keys necessary for the customer to access the ordered television channels.

The customer location information is used to generate the fill data such that the original data can only be recovered from the fill data if the recipient device is located at the location of the customer. The data loader apparatus may further have the ability to identify a current location of the apparatus, such as using a GPS receiver or assisted-GPS system, with the fill data generator being unable to unlock the fill data if the identified current location is not consistent with a predetermined location for the apparatus.

The Class_A data loader may also include a "no-move" system including a motion detector adapted to detect movement of the apparatus. Detected movement above a predefined threshold level produces an alarm condition that may cause the original data to be destroyed in order to prevent misappropriation of the original data. A timer included with the data loader apparatus would permit a period of time for transport of the apparatus without producing the alarm condition. During this time period, the Class_A loader would be inhibited from generating fill data.

In another embodiment of the invention, a Class_B data loader comprises a data memory adapted to store locked fill data received from a Class_A loader, a location identifier adapted to identify a current location for the Class_B loader, and a fill data converter adapted to recover fill data from the locked fill data and transfer the fill data to a customer recipient device. As with the first embodiment, the fill data can be recovered (i.e., unlocked) only if the current location is consistent with a predetermined customer location. The location identifier further comprises a GPS satellite navigation signal receiver. Additionally, the location identifier may further include a location memory adapted to store a last known current location and time for a predetermined period of time upon detecting a GPS satellite navigation signal outage condition. The Class_B loader would generally be loaded with fill data by a Class_A loader, and then transported to a customer location to load the fill data into a recipient device.

In yet another embodiment of the invention, a communication network includes a data originator device having digital data to be distributed, a first data loading device (e.g., a Class_A loader) disposed at a first predetermined location, and a recipient device. The data originator device adds a first level of encryption to the digital data that can only be removed at the first predetermined location. The first data-loading device is adapted to receive the digital data having the first level of encryption. The first data-loading device removes the first level of encryption from the digital data and adds a second level of encryption to the digital data. The recipient device is adapted to receive the digital data having the second level of encryption, and can remove the second level of encryption only when it is disposed at the second predetermined location.

The first data-loading device may additionally add a third level of encryption to the digital data. A second data-loading device (e.g., a Class_B loader) is adapted to receive from the first data-loading device the digital data having the second and third levels of encryption. The second data-loading device removes the third level of encryption from the digital data only when it is disposed at the third predetermined location. The second data-loading device thereafter provides to the recipient device the digital data with only the second level of encryption remaining. The second data-loading device is intended to be a portable device.

In still another embodiment of the invention, a data-handling apparatus includes a "no-move" system that precludes compromise of data contained therein if the data-handling apparatus is moved. The data-handling apparatus may include a cipher device used to perform cipher functions on digital data in accordance with a location identity such that the cipher functions are only performed if a current physical location of the apparatus corresponds to predetermined location parameters. The "no-move" system can identify the current physical location of the apparatus, such as using a GPS receiver or assisted-GPS system. Alternatively, the data-handling device may be loaded with location information, such as by a Class_A loader. A motion detector is adapted to detect movement of the apparatus after the "no-move" system is activated, such as during conditions in which the current physical location cannot be identified, e.g., during an outage of GPS satellite navigation signals. A last known physical location of the apparatus may be utilized during such conditions. Upon detection of movement above a predefined threshold level, the motion detector produces an alarm condition that inhibits operation of the cipher device. The alarm condition may further cause the cipher device to destroy the digital data. The "no-move" system may further include a timer coupled to the motion detector to define a period of time for transport of the apparatus without producing the alarm condition.

A more complete understanding of the assisted GPS signal detection and processing system for indoor location determination will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The invention satisfies the need for a system for providing secure communication of information to recipient devices in a manner such that the information can only be communicated or accessed at specified locations. The invention also provides a system to protect a device containing critical information, such as encryption/decryption keys, by rendering the critical information unusable to unauthorized persons if the device were misappropriated. In the description that follows, like element numerals are used to describe like elements illustrated in one or more of the figures.

Figure 1:
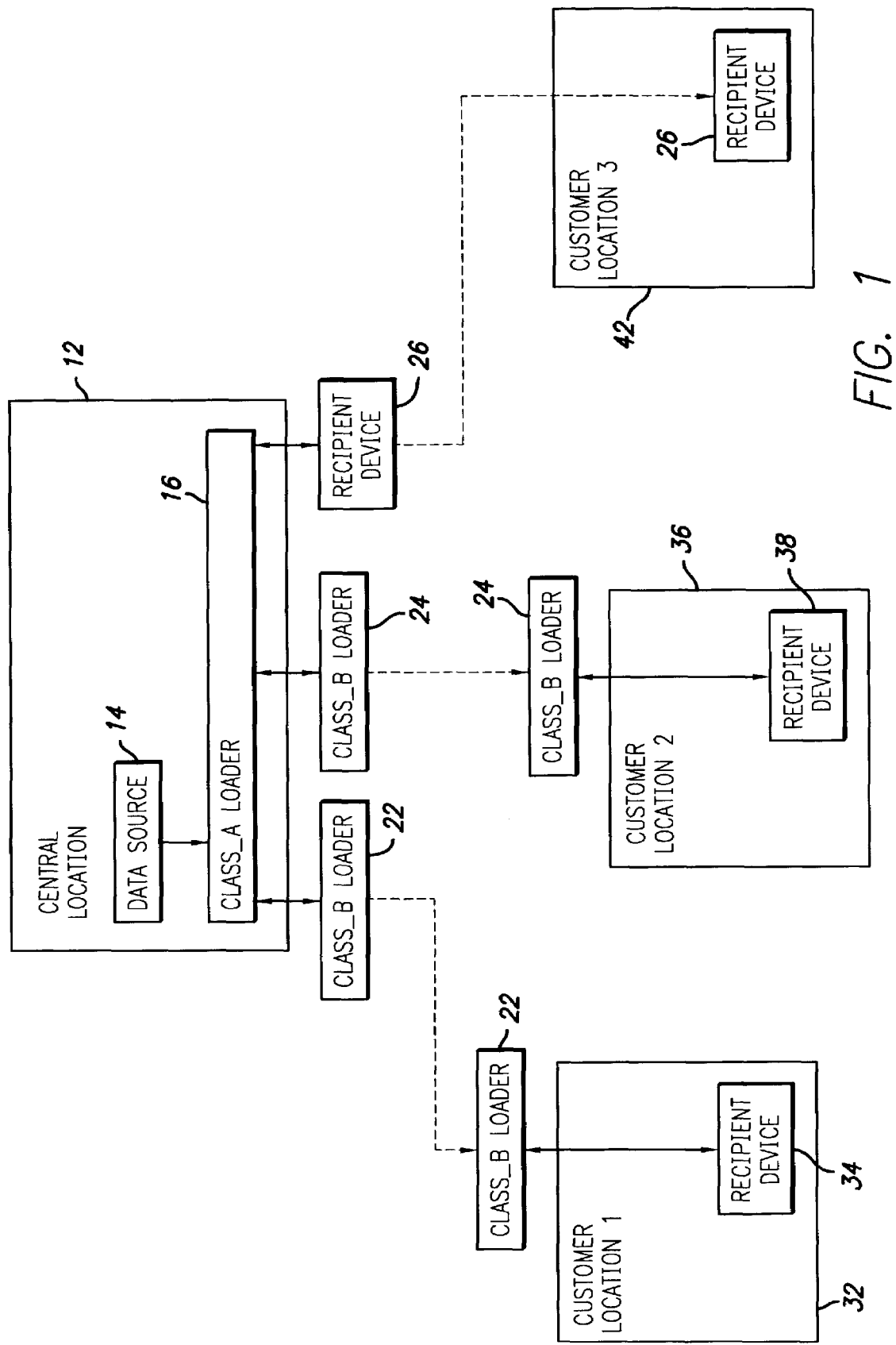
FIG. 1 is a block diagram of an exemplary network using loader devices to control the delivery of information to recipient devices.

Referring first to FIG. 1, a general block diagram illustrates an exemplary communication network using loader devices to manage the delivery of information to recipient devices. The network includes central location 12 and a plurality of customer locations 32, 36, 42. The central location 12 contains a data source 14, and it is desired to distribute data from the data source 14 to recipient devices 34, 38, 26 disposed at the respective customer locations 32, 36, 42. The actual data to be distributed can be of any type or for any purpose, such as cryptography keys, address information, operational parameters, and the like, except that it is desired to permit access to the data only at the customer locations 32, 36, 42. The central location 12 further includes a Class_A loader 16 that is connected to the data source 14. The Class_A loader 16 is intended to remain in a fixed location, such as a service depot or retail outlet, as will be better understood from the description that follows.

The Class_A loader 16 is used to transfer data from the data source 14 to the recipient devices 34, 36, 26, either directly or through a Class_B loader 22, 24. The Class_A loader 16 would only be able to transfer the data if the Class_A loader 16 is located in the appropriate place. To ascertain whether the Class_A loader 16 is in the appropriate place, the Class_A loader 16 may include a receiver for accessing satellite navigation signals, such as Global Positioning System or GPS. If the Class_A loader 16 is located in a place in which satellite navigation signals are attenuated, such as within a building, the Class_A loader 16 may include an assisted GPS (A-GPS) system that enables end users to obtain indoor location information using data that aids in receiving the attenuated satellite navigation signals. An exemplary A-GPS system is disclosed in co-pending patent application Ser. No. 10/193,586, filed Jul. 10, 2002, for ASSISTED GPS SIGNAL DETECTION AND PROCESSING SYSTEM FOR INDOOR LOCATION DETERMINATION, which is incorporated by reference herein. The Class_A loader 16 may itself be loaded with location information by another device, such as a Class_B loader (described below). The Class_A loader 16 may further include a system that detects movement of the Class_A loader 16 from its fixed position. Any movement of the Class_A loader 16 that is detected may then cause the Class_A loader to disable operation and/or destroy any data that it is holding so as to prevent compromise of the data by misappropriation of the Class_A loader.

With the Class_A loader 16 located in the proper position, the Class_A loader can transfer the stored data to a Class_B loader 22, 24. The Class_B loader 22, 24 is intended to be a transportable device that can be physically taken to a customer location. For example, a customer service agent may transport the Class_B loader 22 to customer locations in order to transfer data to each customer's respective recipient device. As shown in FIG. 1, the Class_B loader 22 is transported to the first customer location 32, whereupon the Class_B loader 22 loads the data into the associated recipient device 34. Likewise, the Class_B loader 24 is transported to the second customer location 36, whereupon the Class_B loader 24 loads the data into the associated recipient device 38. Significantly, the Class_B loader 22, 24 would only be able to transfer the data to the respective recipient device 34, 38 when the Class_B loader is located in the appropriate place, i.e., the respective customer location 32, 36. Since the Class_A loader 16 knows in advance the customer locations 32, 36, the original data load to the respective Class_B loader 22, 24 is transformed such that it can only be recovered by the recipient device located in the appropriate customer location. This way, the Class_B loader 22, 24 could not be used to transfer data to a recipient device at an unauthorized location. It should also be appreciated that each Class_B loader 22, 24 could be adapted to store and load data for plural customer locations.

The Class_A loader 16 could also transfer the stored data directly into a recipient device 26 that is physically transported to the central location 12, thereby avoiding the need for an intermediary Class_B loader. The recipient device 26 could then be transported to the appropriate customer location 42 for use. For example, a customer may go directly to the central location 12 to pick up a recipient device 26 that is loaded specifically for the customer's location. As with the Class_B loader 22, 24, the recipient device 26 would only be able to access the data when it is located in the appropriate place, i.e., the customer location 42. So, the recipient device 26 would not work if it were taken to a location other than the customer location 42.

In a preferred-embodiment of the invention, access to the data is controlled by encrypting the data in such a manner that it can be decrypted only at a specified location and with a secret key. Data encrypted in such a manner is said to be geo-encrypted. This geo-encryption process comprises a method in which plaintext data is first encrypted using a random data-encrypting key that is generated at the time of encryption. The data-encrypting key is then encrypted (or locked) using a location value and a key-encrypting key. The encrypted data-encrypting key is then transmitted to the receiver along with the ciphertext data. The receiver both must be at the correct location and must have a copy of a corresponding key decrypting key in order to derive the location key and decrypt the data-encrypting key. After the data-encrypting key is decrypted (or unlocked), it is used to decrypt the ciphertext. If an attempt is made to decrypt the data-encrypting key at an incorrect location or using an incorrect key decryption key, the decryption will fail. In addition, the encrypted data encrypting key or ciphertext optionally may be rendered unusable so that it becomes impossible to ever decrypt that particular ciphertext. An exemplary geo-encryption method and apparatus is disclosed in co-pending patent application Ser. No. 09/992,378, filed Nov. 16, 2001, for SYSTEM AND METHOD FOR DELIVERING ENCRYPTED INFORMATION IN A COMMUNICATION NETWORK USING LOCATION IDENTITY AND KEY TABLES, which is incorporated by reference herein.

Figure 5:
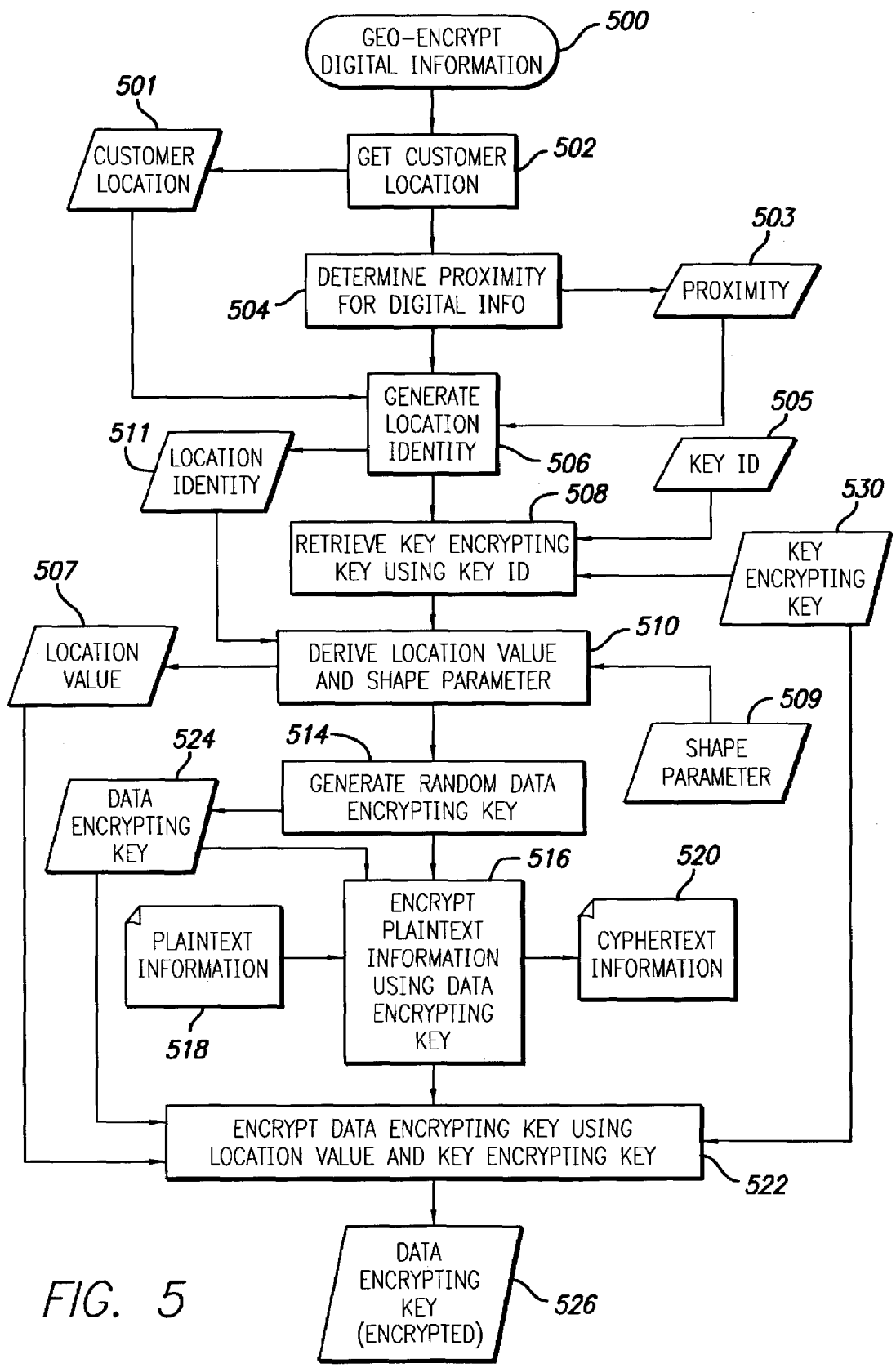
FIG. 5 is a flowchart illustrating an exemplary method for geo-encrypting digital data using a location identity attribute.

FIG. 5 illustrates a general method for associating digital data with a location identity attribute 511 that precisely defines the region in which access of the digital data is permitted. The method starts at step 500 with a command to geo-encrypt digital data using a location identity attribute. A first part of the method provides for the generation of the location identity attribute. The location identity attribute comprises two items of information: (a) a location value, and (b) a proximity value. The location value corresponds to the unique geographic position of a particular place, such as corresponding to the location of the customer. The proximity value corresponds to the extent of a zone or area that encompasses the location. The location identity attribute may comprise a point location or an exact location if the proximity value is set to zero, null, empty, etc., or some other value indicating that the area referred to by the location identity attribute is a unique point location. At step 502, a customer location 501 for the digital data is retrieved from memory and held for later use. Proximity 503 of the location identity attribute 511 is determined at step 504, and the customer location 501 and proximity 503 are used to generate the location identity attribute 511 at step 506.

Any geographic region or area that contains the customer location can serve as the proximity for the location identity attribute. The proximity may comprise a rectangular region defined by two adjacent longitude lines (providing horizontal edges) and two adjacent latitude lines (providing vertical edges). Alternatively, the proximity may comprise a circular region represented by a single number defining the radius around the location. The circular region can be further defined as an elliptical area either centered at the location, or a circular or elliptical area that contains the location but not necessarily as the centroid. In another alternative, the proximity may comprise an irregular closed polygon, or a corridor.

A second part of the method provides for the generation of encryption keys and the encryption of the plaintext digital information. At step 508, a key ID 505 is used to select and retrieve a key encrypting key 530 from a key table that allows for the storage of a plurality of keys. The location identity 511 is then used at step 510 to derive a location value 507 and a shape parameter 509. The shape parameter 509 defines a shape of an area of interest without identifying the specific location corresponding to the area of interest. The shape parameter 509 is a locationless translation of the proximity portion of the location identity attribute 511. Locationless refers to the characteristic of the shape parameter 509 as defining the shape of a proximate area without reference to any actual location.

Then, at step 514, the process generates a random data encrypting key 524. This data encrypting key 524 is used to encrypt the plaintext digital information 518 at step 516 to produce geo-encrypted digital information 520. The data encrypting key 524 is then encrypted at step 522 using the location value 507 and the key-encrypting key 530. The geo-encrypted digital information 520, the encrypted data encrypting key 526 (also referred to below as a cipher key), the shape parameter 509, and the key ID 505 are then communicated to a receiving device (e.g., the Class_A loader, Class_B loader or recipient device). Attempts to decrypt the geo-encrypted information 520 by the receiving device will be denied unless the location of the receiver device 400 matches the location specified by the location identity attribute 511 and the receiving device has the correct key decrypting key identified by the key ID 505.

Figure 6:
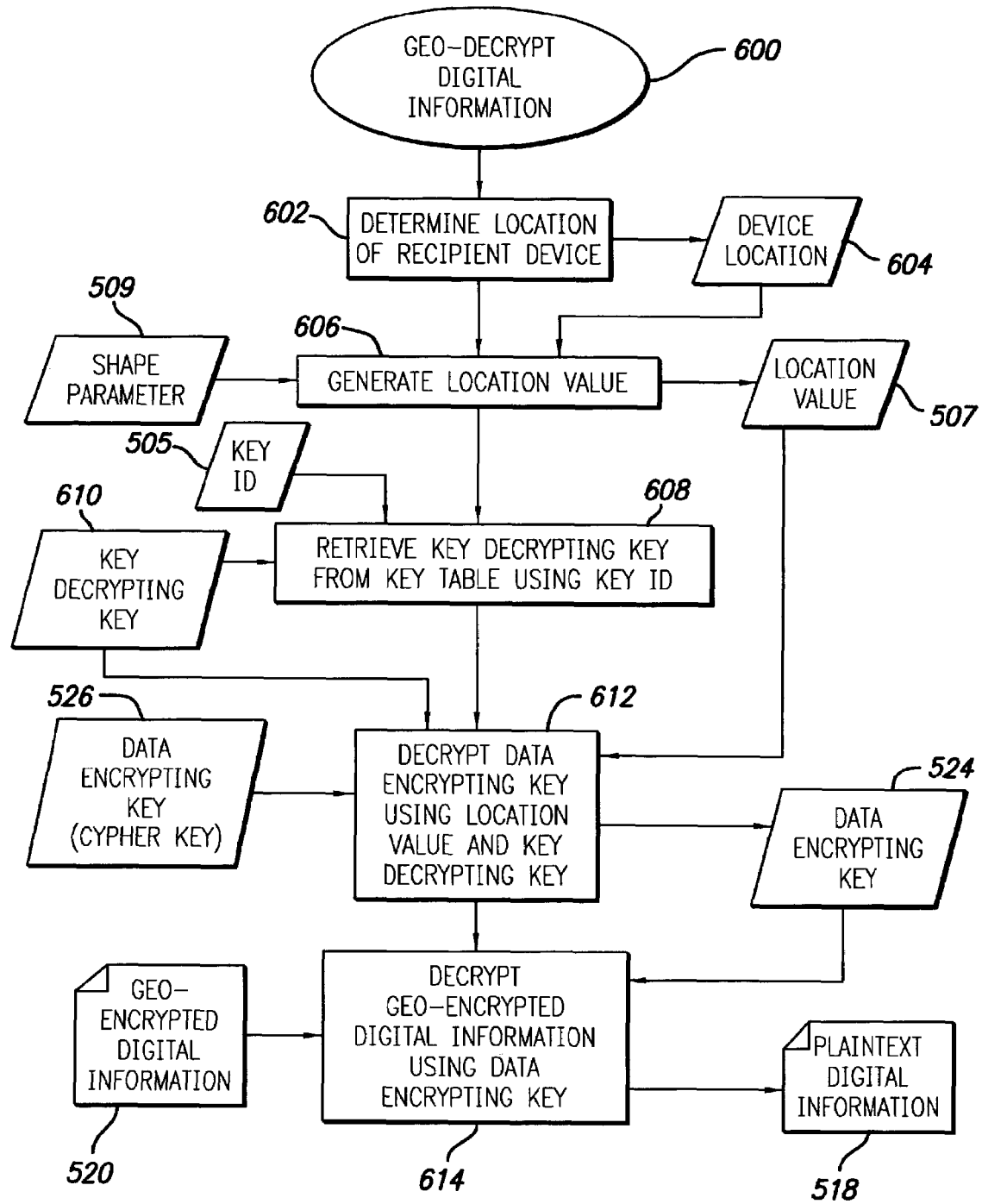
FIG. 6 is a flowchart illustrating an exemplary method for accessing geo-encrypted digital data using the location identity attribute.

FIG. 6 shows a general method for enforcing access to geo-encrypted digital information by location. The method starts at step 600 with a command to decrypt the geo-encrypted digital information 520. A first part of the method provides for the generation of the location value 507. At step 602, the method determines the location of the receiver device, such as using satellite navigation signals. The device location information 604 is then used in conjunction with the shape parameter 509 received from the provider of the geo-encrypted digital information to generate the location value 507 at step 606. As will be appreciated, the location value 507 generated by the receiving device must match the location value 507 used by the providing device to geo-encrypt the digital information, otherwise the receiving device will be unable to geo-decrypt the encrypted digital information 520.

In a second part of the method, the location value 507 is used with a key decrypting key 610 to geo-decrypt the encrypted digital information. The key-decrypting key 610 is retrieved from the key table of the receiving device at step 608 in accordance with the key ID 505 received from the providing device. It should be appreciated that the key-decrypting key 610 retrieved at step 608 must correspond to the key encrypting key 530 used in geo-encrypting the digital information; otherwise, the geo-decryption will fail. At step 612, the selected key decrypting key 610 and the generated location value 507 are used to decrypt the data encrypting key 526. If the location of the receiving device is consistent with the location value 507 used by the providing device, the decryption will recover the original data encrypting key 524. Lastly, the data encrypting key 524 is used to decrypt the geo-encrypted digital information 520 to recover the plaintext digital information 518 at step 614.

Figure 2:
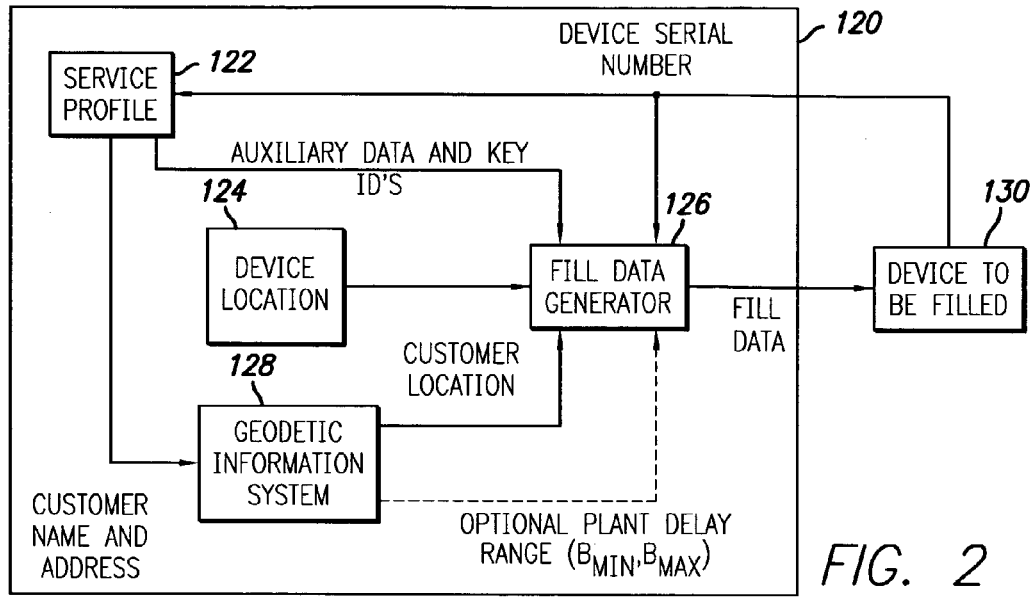
FIG. 2 is a block diagram of a Class_A loader in accordance with an embodiment of the invention.

Returning now to FIG. 2, a functional-block diagram of a Class_A loader 120 is shown in accordance with an embodiment of the invention. A central element of the Class_A loader 120 is a fill data generator 126 that produces fill data to be transferred to a device to be loaded 130, e.g., a Class_B loader or recipient device. In a preferred embodiment of the invention, the fill data generator 126 geo-encrypts digital data in accordance with the method described above with respect to FIG. 5. The fill data generator 126 receives a plurality of inputs in order to produce the fill data. A service profile 122 comprises a database containing information regarding the customers (e.g., name, address, service type, etc.) as well as the auxiliary data and key IDs to be transferred. For example, the Class_A loader 12 may be used to load television set top boxes with keys used to decrypt television signals transmitted over a cable system or other media, with each key corresponding to a particular channel or network (e.g., HBO®, TNT®, TBS®, CARTOON NETWORK®, CNN®, CINEMAX®, etc.). A customer may order a suite of services including certain channels, and the Class_A loader 120 may be used to load the customer's set top box with the appropriate keys to receive these channels. The fill data generator 126 would receive the auxiliary data and key IDs from the service profile 122.

The service profile 122 would also provide the customer address information to a geodetic information system 128 that would convert the address information into a geographic location in accordance with appropriate coordinates, e.g., latitude, longitude, and altitude. The geodetic information system 128 may comprise a layered map or database used to perform the address translation. The geographic location information is provided to the fill data generator 126, where it becomes part of the location identity used to encrypt the auxiliary data and other information that is to be transferred to the device 130. The device 130 may further have a unique device serial number that is provided back to the service profile 122. This way, the service profile 122 can maintain a record of which device received the encrypted data for a particular customer. The device serial number may further be included with the auxiliary data to be encrypted, thereby providing a further verification that the appropriate device received the data.

In an embodiment of the invention, the geodetic information system 128 may also provide cable plant delay information ($b_{CABLE}$) corresponding to the signal delay between the headend and customer location of a cable plant used to deliver cable television signals or other electronic media. The recipient device could then use the cable plant delay information to aid in calculating precise location information using an assisted-GPS system (as described in co-pending patent application Ser. No. 10/193,586, identified above). Note that $b_{CABLE}$ will be different for different user equipment because the path from the headend is not identical. When the cable plant is used to deliver satellite navigation signals received at the headend to the customer, a position solution based on those signals will have an internal time bias that is wrong by $b_{CABLE}$ seconds. If $b_{CABLE}$ is known, it can provide the customer with the basis for a precise time hack. For fixed connection end users, it should be appreciated that $b_{CABLE}$ should be relatively fixed in value, so that once known $b_{CABLE}$ can be stored in memory for future use.

Additionally, since $b_{CABLE}$ is different for every customer, the cable plant delay can serve as a unique location signature for the customer. The cable delay $b_{CABLE}$ can be initially measured using a two-way cable modem. Several known cable modem standards (e.g., DOCSIS 1.0) incorporate provisions for measuring cable plant delay in order to facilitate efficient upstream TDMA messaging on a shared frequency channel. The initial measured value for the cable plant delay $b_{CABLE}$ could be included in the location identity that is used to encrypt data communicated to the customer. The customer would then measure $b_{CABLE}$ as part of each communication operation. If the measured $b_{CABLE}$ value is outside of a specified range, the customer would be unable to decrypt the data.

The fill data generator 126 also receives a geographic location in appropriate coordinates for the Class_A loader 120 from device location block 124. The fill data generator 126 uses this geographic location information to ensure that the Class_A loader 120 is in the proper location, i.e., it has not moved. As described above, the Class_A loader 120 will only be able to transfer fill data to the device 130 if the Class_A loader is located in the appropriate place. The device location block 124 may include a GPS receiver that receives satellite navigation signals and derives location information therefrom. But, since it is anticipated that the Class_A loader 120 be located indoors where GPS signals may be attenuated, the device location block 124 of the Class_A loader may include other systems for verifying location, such as an assisted-GPS system and/or a "no move" system, which will each be described further below.

In an embodiment of the present invention, the device location block 124 includes an assisted-GPS system as described in co-pending patent application Ser. No. 10/193,586, identified above. The Class_A loader 120 may be connected via a cable plant or other transmission media to a GPS receiver (not shown) in another location having unobstructed sky access to the GPS satellites. The GPS receiver receives the satellite signals and provides an A-GPS signal to the device location block 124 of the Class_A loader 120. The device location block 124 uses the A-GPS signal to recover the attenuated satellite navigation signals.

As known in the art, the GPS satellites transmit two specially coded carrier signals, including the L1 signal for civilian use and the L2 signal for military and governmental use. GPS receivers process the signals to compute the user's position within a radius of ten meters or better as well as an accurate time measure. The course/acquisition (C/A) signal is one of the signals modulated on the L1 carrier. The C/A code is used to determine pseudorange (i.e., the apparent distance to the satellite plus time bias), which is then used by the GPS receiver to determine position. The C/A code is a pseudorandom noise (PN) code, meaning that it has the characteristics of random noise, but is not really random. To the contrary, the C/A code is very precisely defined. There are thirty-seven PN sequences used for the C/A code, and each GPS satellite broadcasts a different code. The PN sequence contains no data; it is simply an identifier; however, its timing is very precisely determined, and that timing is used to determine the pseudorange. The PN sequences are each a sequence of zeros and ones (binary), with each zero or one referred to as a "chip" rather than a bit to emphasize that the zeros and ones do not carry data. The C/A signal has a 1.023 MCh/sec chipping rate and a code length of 1,023, so it repeats itself after every 1 msec interval.

Another signal modulated onto the L1 carrier is the broadcast data message, which includes information describing the positions of the satellites. Each satellite sends a full description of its own orbit and clock calibration data (within the ephemeris information) and an approximate guide to the orbits of the other satellites (contained within the almanac information). The broadcast data message is modulated at a much slower rate of 50 bps.

In order to receive a GPS signal and measure the pseudorange to the satellite, a GPS receiver performs a correlation process in which a search is conducted for the satellite's unique PN code. The received signal is checked against all of the possible PN codes. The GPS receiver generates each of these codes and checks for a match. Even if the GPS receiver generates the right PN code, it will only match the received signal if it is lined up exactly. Because of the time delay between broadcast and reception, the received signal also has to be given a time delay. When a match is found, the GPS receiver identifies the PN code (and therefore the satellite). Using the ephemeris and clock calibration data contained in the 50 bps broadcast data message, the GPS receiver can calculate the time delay (and therefore the pseudorange).

The correlation process is conducted in a carrier frequency dimension and a code phase dimension. In the carrier frequency dimension, the GPS receiver replicates carrier signals to match the frequencies of the GPS signals as they arrive at the receiver. But, due to the Doppler effect, the frequency f at which the GPS signal is transmitted by the satellite changes by an amount $\Delta f$ before the signal arrives at the receiver. Thus, the GPS signal should have a frequency $f+\Delta f$ when it arrives at the receiver. During search and acquisition, to account for the Doppler effect, the GPS receiver replicates the carrier signals across a frequency spectrum until the frequency of the replicated carrier signal matches the frequency of the received signal. Similarly, in the code phase dimension, the GPS receiver replicates the unique PN codes associated with each satellite. The phases of the replicated PN codes are shifted across a code phase spectrum until the replicated carrier signals modulated with the replicated PN codes correlate, if at all, with GPS signals received by the receiver. The code phase spectrum includes every possible phase shift for the associated PN code.

The correlation process is implemented by a correlator that performs a multiplication of a phase-shifted replicated PN code modulated onto a replicated carrier signal with the received GPS signals. The GPS receiver essentially performs a search of two parameters: Range and Doppler. The receiver divides the field of uncertainty into Range/Doppler bins and looks in each bin to see if that corresponds to a correct pair of values. Setting the carrier frequency and code phase has the effect of tuning the correlator to a particular Range/Doppler combination. The envelope response peaks when the correlator is tuned to the appropriate Range/Doppler combination. Otherwise, unless the tuning is close to the correct values, the envelope response is minimal. Once properly tuned, the receiver can recover the navigation data from the detected GPS signals and use the navigation data to determine a location for the receiver.

The A-GPS signal assists the Class_A loader 120 in two respects. First, the A-GPS signal includes the 50 bps broadcast data message recovered from the GPS satellite signals that contains satellite orbital information and clock correction parameters for all satellites in view at the location of the GPS receiver. This information helps the device location block 124 figure out where the GPS satellites are as well as the pseudorange to the satellites. Second, the satellite orbital information and clock correction parameters can be used to narrow down the search of Range/Doppler bins by eliminating unlikely combinations. By knowing how the GPS satellites move as a function of time and an approximate location for the Class_A loader 120, the device location block 124 can predict better which Range/Doppler combinations are likely to result in a correlation, thereby reducing the numbers of correlators that are employed for this purpose.

Figure 4:
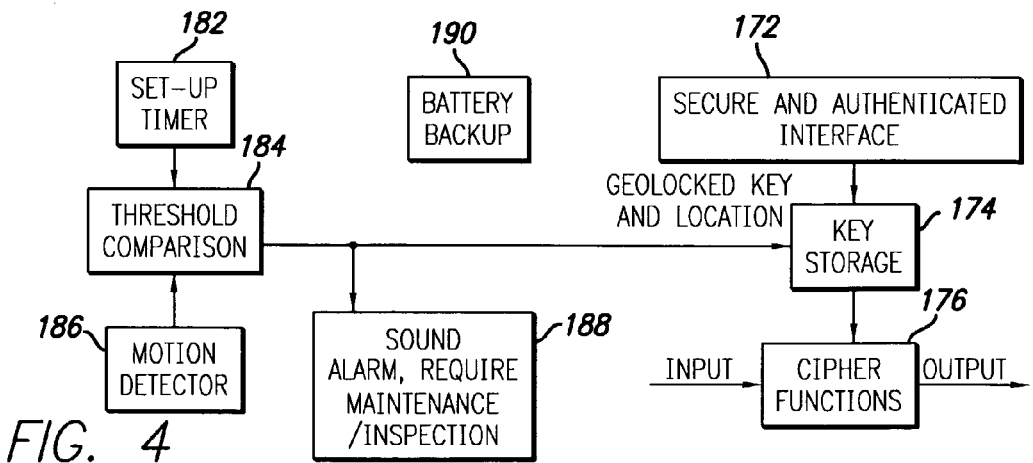
FIG. 4 is a block diagram of a "no-move" system for use with the Class_A loader of FIG. 2.

FIG. 4 illustrates an embodiment of the Class_A loader including a "no-move" system. The purpose of the "no-move" system is to ensure that the Class_A loader is not moved after it has been installed. While a GPS receiver would be able to monitor position, and thereby detect movement of the Class_A loader, attenuation of the GPS satellite navigation signals makes this solution impractical for certain indoor applications. The Class_A loader includes a key storage 174 that is loaded via a secure and authenticated interface 172 with one or more keys used for encrypting and decrypting data. The keys may be geo-locked in the manner discussed above. This initial loading operation may be performed at a location different than the ultimate operational location for the Class_A loader. In that case, the keys would be geo-locked for the intended operational location for the Class_A loader. Once located in the intended operational location, the keys can be retrieved from the key storage 174 for use in cipher functions 176 as discussed above.

More particularly, the "no-move" system includes a set-up timer 182, a threshold comparison 184, and a motion detector 186. The set-up timer 182 enables the "no-move" system to define a time period in which the "no-move" system is inoperative, thereby allowing the Class_A loader to be transported to the intended operational location. The "no move" system becomes operational when the time period defined by the set-up timer 182 has elapsed. The motion detector 186 detects any physical movement of the Class_A loader. A conventional two-axis acceleration sensor (e.g., Analog Devices ADXL202/ADXL210) or other like device may provide the motion detector 186. Any movement that is detected by the motion detector 186 is reported to the threshold comparison 184, which compares the detected movement to a predetermined threshold level. The predetermined threshold level may be selected such that nominal movement of the Class_A loader, e.g., within a few feet, would not trigger the "no-move" system. But, any movement that exceeds the predetermined threshold level would trigger an alarm system 188. The alarm system 188 may produce an audible/visible alarm and/or send a signal to maintenance personnel to check on the status of the Class_A loader. The threshold comparison 184 may also provide a command to the key storage 174 instructing that all keys contained therein be destroyed. This would prevent access to the keys if the Class_A loader were moved to another location beyond the range of the predetermined threshold level. The "no-move" system may further include a battery backup 190 power source that maintains operation of the threshold comparison 184 and motion detector 186 in the event of loss of electrical power to the Class_A loader.

In an alternative embodiment of the invention, the "no-move" system of FIG. 4 could be utilized in other systems besides data loaders. For example, the "no-move" system could be utilized in any device that also includes an A-GPS system. In such a device, the A-GPS system would provide primary location determination as long as sufficient (albeit attenuated) GPS signals are available. The A-GPS system then passes the location estimate to the "no-move" system. When the A-GPS system is unable to estimate location, the "no-move" system becomes operational, using the last known position from the A-GPS system from which to measure movement against.

The "no-move" system could also be utilized in a device that does not have an independent way to determine location, but rather may include a memory that is loaded with location information, such as by a Class_A or Class_B loader (discussed below). Once loaded with location information, the device may have a certain amount of time before the "no-move" system becomes operational. After this time expires, any movement of the device beyond the predetermined threshold would trigger an alarm condition as described above. While this alternative embodiment would have particular applicability to systems that utilize cipher functions to encrypt/decrypt data, the "no-move" system could also have broader applicability to provide anti-theft and information protection for computers and other data handling systems.

Figure 3:
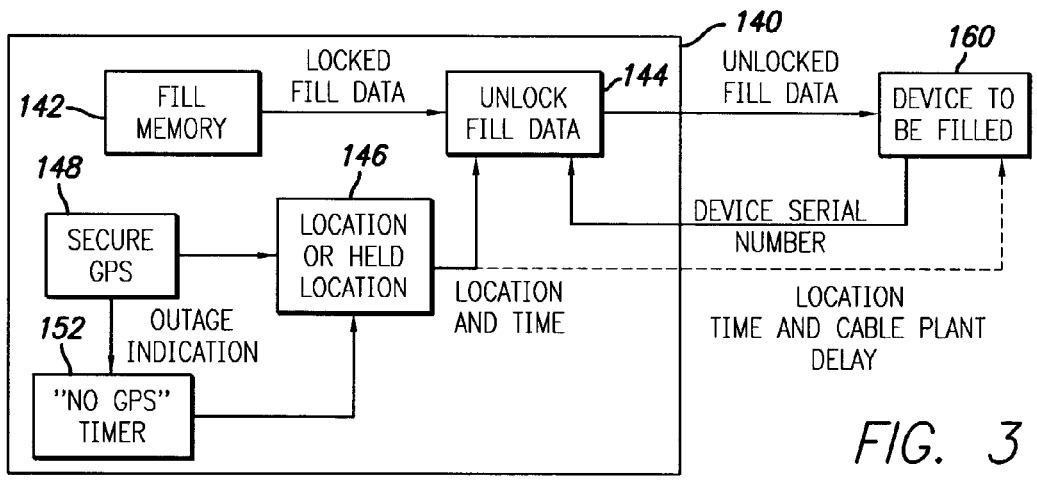
FIG. 3 is a block diagram of a Class_B loader in accordance with an embodiment of the invention.

Turning now to FIG. 3, a block diagram of an exemplary Class_B loader 140 is illustrated. As described above, the Class_B loader 140 is intended to be a portable device. The Class_B loader 140 includes a fill memory 142 that stores the fill data received from a Class_A loader. It should be appreciated that the fill data stored in the fill memory 142 is locked, i.e., it is geo-encrypted in accordance with the method described above with respect to FIG. 5. The Class_B loader 140 further includes a device 144 that unlocks the geo-encrypted fill data in order to transfer the fill data to a device to be loaded 160, e.g., a recipient device. In a preferred embodiment of the invention, the fill data unlocking device 144 geo-decrypts the digital data in accordance with the method described above with respect to FIG. 6. The fill data unlocking device 144 receives a geographic location in appropriate coordinates for the Class_B loader 140 from location block 146. The fill data unlocking device 144 uses this geographic location information to ensure that the Class_B loader 140 is in the proper location, e.g., the customer location. As described above, the Class_B loader 140 will only be able to transfer fill data to the device 160 if the Class_B loader is located in the appropriate place. The device 160 may further have a unique device serial number that is provided back to the fill data unlocking device 144. The device serial number can be checked against information contained in the fill memory 142 in order to provide a further verification that the appropriate device 160 will receive the data.

The Class_B loader 140 further includes a GPS receiver 148 that provides the geographic location information to the location block 146. Since it is anticipated that the Class_B loader 140 be a portable device that is often carried indoors where GPS signals may be attenuated, the location block 140 further includes a memory that will hold the last geographic location information received from the GPS receiver 148. When the GPS receiver 148 is unable to receive satellite navigation signals due to signal attenuation, i.e., a GPS outage, a timer 152 initiates a count for a predetermined period of time. The location block 146 will continue to hold the last received geographic location information until the predetermined period of time is reached, whereupon the fill data unlocking device 144 will cease unlocking the geo-encrypted fill data. This predetermined period of time should be sufficient to permit an operator to load a recipient device 160 with fill data, while limiting time for inappropriate uses of the Class_B loader 140.

In an embodiment of the invention, the location block 146 may also provide cable plant delay information ($b_{CABLE}$) corresponding to the signal delay between the headend and customer location of a cable plant used to deliver cable television signals or other electronic media. The recipient device could then use the cable plant delay information to calculate precise location information using an assisted-GPS system (as described above and in co-pending patent application Ser. No. 10/193,586, identified above). Moreover, the location block 146 may also provide an accurate time hack to the recipient device 160. The correlator count of a GPS receiver in the recipient device 160 can be reduced by providing a time hack of sufficient accuracy to permit searching fewer than all PN code phases. The Class_B loader 140 may further include a precision oscillator (e.g., TCXO, OCXO (temperature-compensated crystal oscillator or "ovenized" crystal oscillator) or Rubidium). Time discipline may be provided by GPS, LORAN, or some other source while the Class_B loader 140 is exposed to appropriate signals, and the precision oscillator used to maintain an accurate time count in the absence of discipline.

Figure 7:
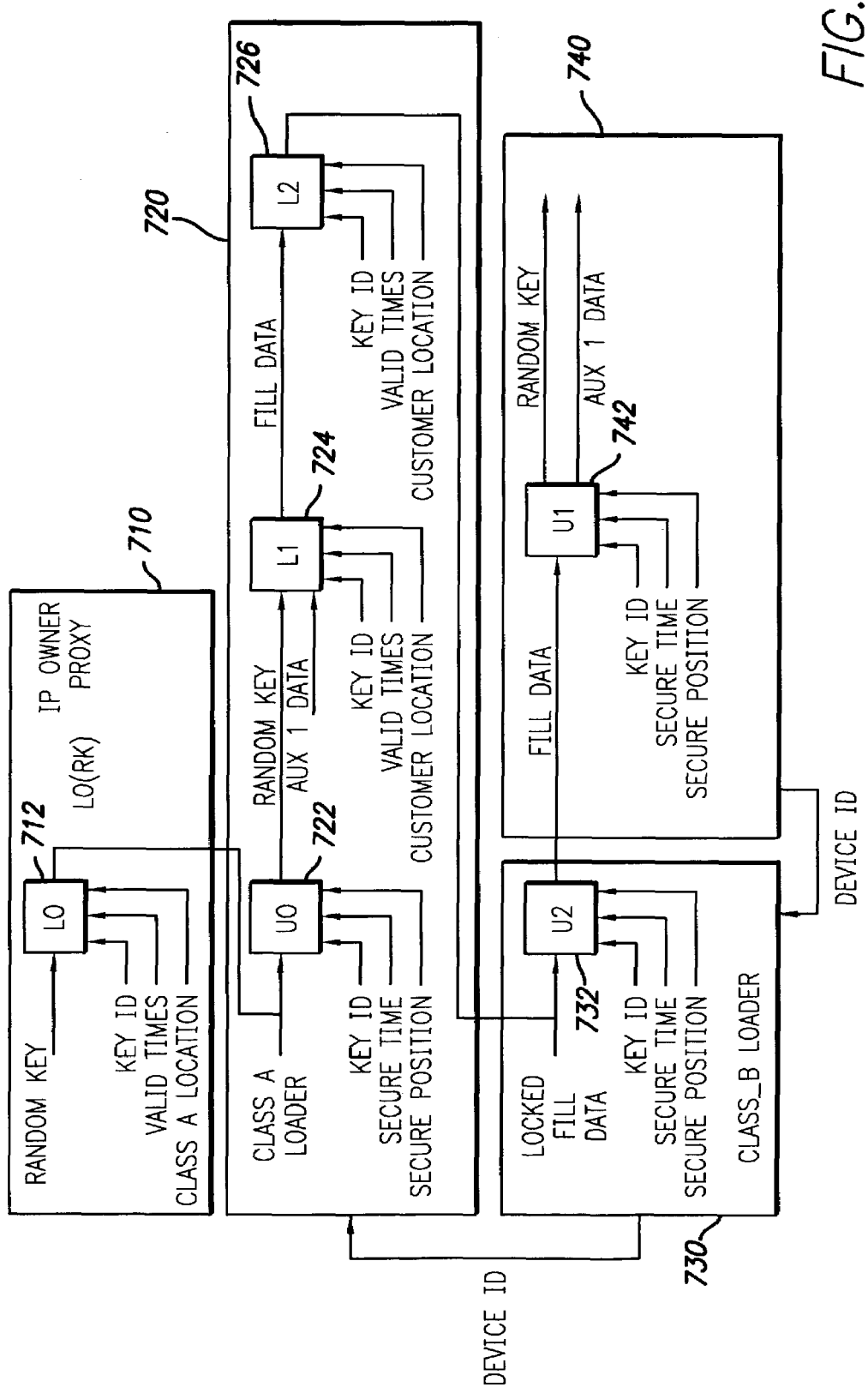
FIG. 7 is a block diagram illustrating communication of information to a recipient device through Class_A and Class_B loaders.

Referring now to FIG. 7, a block diagram illustrates an example of secure communication of information to a recipient device through Class_A and Class_B loaders. An intellectual property (IP) owner or proxy 710 has a random key that is used to encrypt digital information, such as a television broadcast. The random key is encrypted using a locking process (L0) 712 to provide a random key L0(RK) that is geo-locked for the location of a Class_A loader. The locking process (L0) 712 receives as inputs the key ID and the location of the Class_A loader. Optionally, the locking process (L0) 712 may further receive valid times in which the geo-locked random key can be decrypted by the Class_A loader.

The geo-locked random key L0(RK) is transferred to the Class_A loader 720. The geo-locked random key is decrypted using an unlocking process (U0) 722 to recover the random key. The unlocking process (U0) 722 receives as inputs the key ID, the secure location of the Class_A loader 720, and (optionally) the secure time. The random key can only be recovered if these inputs match the inputs used by the locking process (L0) 712 to geo-lock the random key. Next, the recovered random key is again encrypted along with other auxiliary data using a locking process (L1) 724 to produce fill data. The locking process (L1) 724 receives as inputs the key ID, the customer location, and (optionally) the valid times in which the fill data may be transferred to a recipient device. The fill data is then encrypted to a second level using a locking process (L2) 726 to produce geo-locked fill data. The locking process (L2) 726 receives as inputs the key ID, the customer location, and (optionally) the valid times in which the locked fill data may be transferred to a recipient device (i.e., a Class_B loader).

The geo-locked fill data is transferred from the Class_A loader 720 to a Class_B loader 730. The Class_B loader 730 may provide the Class_A loader 720 with a device ID or serial number to provide further validation of the transfer. The Class_B loader 730, containing the geo-locked fill data stored in memory, may be physically transported to a customer location to load a recipient device 740. The Class_B loader 730 removes the second level of encryption using an unlocking process (U2) 732 to recover the fill data, which is loaded into the recipient device 740. The unlocking process (U2) 732 receives as inputs the key ID, the secure location of the Class_B loader 730, and (optionally) the secure time. The fill data can only be recovered if these inputs match the inputs used by the locking process (L2) 726 used to geo-lock the fill data. The recipient device 740 may provide the Class_B loader 730 with a device ID or serial number to provide further validation of the transfer.

Lastly, the recipient device 740 decrypts the fill data using an unlocking process (U1) 742 to recover the random key and auxiliary data. The unlocking process (U1) 742 receives as inputs the key ID, the secure location of the recipient device 740, and (optionally) the secure time. The random key and auxiliary data can only be recovered if these inputs match the inputs used by the locking process (L1) 724 to geo-lock the random key and auxiliary data. The recipient device 740 can then utilize the random key to decrypt digital information, such as the originally encrypted television broadcast distributed by the IP owner or proxy 710.

Having thus described preferred embodiments of a data loader using location identity to provide secure communication of data to recipient devices location determination, it should be apparent to those skilled in the art that certain advantages of the above-described system have been achieved. It should also be appreciated that various modifications, adaptations, and alternative embodiments thereof may be made within the scope and spirit of the present invention. The invention is further defined by the following claims.

What is claimed is:

1. An apparatus for distributing data, comprising:
   a service profile containing customer location information and original data to be distributed to at least one customer, said customer location information being used to generate a customer location value;
   a fill data generator adapted to use a data encryption key to encrypt said original data, and to use at least said customer location value to encrypt said data encryption key, said data encryption key being used by a recipient device to decrypt said encrypted original data, and a current location value being used by said recipient device to decrypt said encrypted data encryption key if said current location value, as generated by said recipient device, corresponds with said customer location value; and
   means for transferring said encrypted original data and said encrypted data encryption key to said recipient device.

2. The apparatus of claim 1, wherein said apparatus further comprises said recipient device, said recipient device comprising means for identifying a current location of said recipient device, said current location being used by said recipient device to generate said current location value.

3. The apparatus of claim 2, wherein said location identifying means further comprises a GPS satellite navigation signal receiver.

4. The apparatus of claim 2, wherein said location identifying means further comprises an assisted-GPS signal receiver.

5. The apparatus of claim 2, wherein said location identifying means further comprises a motion detector adapted to detect movement of said apparatus, wherein detected movement above a predefined threshold level produces an alarm condition.

6. The apparatus of claim 5, wherein said original data is destroyed upon said alarm condition.

7. The apparatus of claim 5, wherein said location identifying means further comprises a timer adapted to permit a period of time for transport of said apparatus without producing said alarm condition.

8. The apparatus of claim 1, further comprising a geodetic information converter adapted to convert said customer location information into geodetic information.

9. An apparatus for distributing data, comprising:
   a data memory storing at least a locked key received from a loader device, said locked key being locked using at least a customer location value;
   a location identifying device to identify a current location for said apparatus, said current location being used to generate a current location value; and
   a data converter for recovering a key from said locked key and transferring at least said key to a customer recipient device, said key being recovered only if said current location value is consistent with said customer location value.

10. The apparatus of claim 9, wherein said location identifying device further comprises a GPS satellite navigation signal receiver.

11. The apparatus of claim 10, wherein said location identifying device further comprises a location memory adapted to store a last known current location for a predetermined period of time upon detecting a GPS satellite navigation signal outage condition.

12. The apparatus of claim 9, wherein said data memory further stores an estimate of time delay of signals communicated to said customer location via a cable plant.

13. The apparatus of claim 9, wherein said data memory further stores an accurate time hack.

14. A communication network, comprising:
- a data originator device having digital data to be distributed, said digital data comprising at least a key used to decode digital information, said data originator device using at least a first predetermined location value to add a first level of encryption to said digital data such that said first level of encryption can only be removed at a first predetermined location;
- a first data loading device adapted to determine a loading device location, use said loading device location to generate a loading device location value, and receive said digital data having said first level of encryption, said first data loading device using at least said loading device location value to remove said first level of encryption from said digital data if said loading device location value is consistent with said first predetermined location value, and using a second predetermined location value to add a second level of encryption to said digital data such that said second level of encryption can only be removed at a second predetermined location; and
- a recipient device adapted to determine a recipient device location, use said recipient device location to generate a recipient device location value, and receive said digital data having said second level of encryption, said recipient device using at least said recipient device location value to remove said second level of encryption from said digital data if said recipient device location value is consistent with said second predetermined location value.

15. The communication network of claim 14, wherein said first data loading device adding a third level of encryption to said digital data such that said third level of encryption can only be removed at a third predetermined location.

16. The communication network of claim 15, further comprising a second data loading device adapted to receive from said first data loading device said digital data having said second and third levels of encryption, said second data loading device removing said third level of encryption from said digital data only when disposed at said third predetermined location, said second data loading device thereafter providing to said recipient device said digital data with said second level of encryption remaining.

17. The communication network of claim 16, wherein said second data loading device is portable.

18. The communication network of claim 16, wherein said second data loading device providing a corresponding device identification (ID) to said first data loading device, said first data loading device using said device ID to verify that said second data loading device is authorized to receive said digital data having said second and third levels of encryption.

19. The communication network of claim 18, wherein said recipient device providing a corresponding device identification (ID) to said second data loading device, said second data loading device using said device ID to verify that said recipient device is authorized to receive said digital data having said second level of encryption.

20. The communication network of claim 14, wherein said first data loading device adding auxiliary data to said digital data prior to adding said second level of encryption, said recipient device recovering both said auxiliary data and said digital data upon removal of said second level of encryption.

21. A method for communicating data, comprising the steps of:
- originating digital data to be distributed, said digital data comprising at least one key for recovering digital signals from encrypted digital signals;
- using at least a first predetermined location value to add a first level of encryption to said digital data such that said first level of encryption can only be removed at a first predetermined location;
- loading said digital data having said first level of encryption into a first loading device;
- determining a location of said first loading device;
- using said location of said first loading device to generate a first loading device location value;
- removing said first level of encryption from said digital data only if said first loading device location value corresponds with said first predetermined location value, and using at least a second predetermined location value to add a second level of encryption to said digital data such that said second level of encryption can only be removed at a second predetermined location;
- loading said digital data having said second level of encryption into a recipient device;
- determining a location of said recipient device;
- using said location of said recipient device to generate a recipient device location value; and
- removing said second level of encryption from said digital data only if said recipient device location value corresponds with said second predetermined location value.

22. The method of claim 21, further comprising the step of adding a third level of encryption to said digital data such that said third level of encryption can only be removed at a third predetermined location.

23. The method of claim 22, further comprising the steps of loading said digital data having said second and third levels of encryption from said first loading device into a second loading device, and removing said third level of encryption from said digital data only if said second loading device is disposed at said third predetermined location.

24. The method of claim 23, further comprising the step of transporting said second loading device from said first predetermined location to said second predetermined location.

25. The method of claim 23, further comprising the steps of providing a device identification (ID) from said recipient device to said second data loading device, and using said device ID to verify that said recipient device is authorized to receive said digital data having said second level of encryption.

26. The method of claim 21, further comprising the step of adding auxiliary data to said digital data prior to adding said second level of encryption.

27. A system for communicating data, comprising:
- a data source containing digital data;
- a first data loader adapted to be operatively coupled to the data source, the first data loader being further adapted to transfer the digital data from the data source to the first data loader, the first data loader using at least one of a first location value and a second location value in applying a first layer of encryption to the digital data;
- a second data loader adapted to be operatively coupled to the first data loader, the second data loader being further adapted to transfer the digital data having the first layer of encryption from the first data loader to the second data loader only if the second data loader is located at a first predetermined location, the second data loader thereafter generating a second data loader location value, removing the first layer of encryption only if said second data loader location value is consistent with said first location value, and using at least said second location value to apply a second layer of encryption to the digital data that is specific to a second predetermined location; and a recipient device adapted to generate a recipient device location value and to be operatively coupled to at least one of the first data loader and the second data loader, the recipient device being further adapted to alternatively:

(a) transfer the digital data having the first layer of encryption from the first data loader to the recipient device only if the recipient device is located at the first predetermined location, the recipient device thereafter removing the first layer of encryption only if the recipient device location value is consistent with said second location value; or (b) transfer the digital data having the second layer of encryption from the second data loader to the recipient device only if the recipient device is located at the second predetermined location, the recipient device thereafter removing the second layer of encryption only if the recipient device location value is consistent with said second location value;

wherein, the recipient device can access the digital data in unencrypted form only when located at the second predetermined location.

28. The system of claim 27, wherein said first data loader further comprises a motion detector adapted to detect movement of said first data loader, wherein detected movement above a predefined threshold level produces an alarm condition.

29. The system of claim 28, wherein the digital data is destroyed upon said alarm condition.

30. The system of claim 28, wherein said first data loader further comprises a timer operatively coupled to the motion detector and adapted to permit a period of time for transport of said first data loader without producing said alarm condition.

31. A method for communicating data to a recipient device, comprising:

using a data encryption key to apply a first layer of encryption to said data;

using at least a customer location value to apply a first layer of encryption to said data encryption key, said customer location value being generated using at least an authorized location of said recipient device;

transmitting, at least indirectly, said encrypted data and said encrypted data encryption key to said recipient device;

determining a current location of said recipient device;

using at least said current location of said recipient device to generate a current location value;

using at least said current location value to remove said first layer of encryption from said data encryption key if said current location value is consistent with said customer location value; and using said data encryption key to remove said first layer of encryption from said data.

32. The method of claim 31, wherein said step of using at least a customer location value to apply a first layer of encryption to said data encryption key further comprises using at least a customer location value and a key encryption key to apply a first layer of encryption to said data encryption key.

33. The method of claim 32, wherein said step of transmitting, at least indirectly, said encrypted data and said encrypted data encryption key to said recipient device further comprises transmitting, at least indirectly, a key ID to said recipient device, wherein said key ID is used by said recipient device to select said key encryption key from a key table.

34. The method of claim 31, wherein said step of transmitting, at least indirectly, said encrypted data and said encrypted data encryption key to said recipient device further comprises transmitting said encrypted data directly from a centralized location to said recipient device.

35. The method of claim 31, further comprising the steps of:

using at least a loader location value to apply a second layer of encryption to said data encryption key, said loader location value being generated using at least an authorized location of a loader;

transmitting, at least indirectly, said encrypted data encryption key to said loader;

determining a current location of said loader;

using at least said current location of said loader to generate a current loader location value; and using at least said current loader location value to remove said second layer of encryption from said data encryption key if said current loader location value is consistent with said loader location value.

36. The method of claim 35, wherein said step of using at least a loader location value to apply a second layer of encryption to said data encryption key further comprises using at least a loader location value and a time value to apply a second layer of encryption to said data encryption key, said time value being generated using at least an authorized time for removing said second layer of encryption from said data encryption key.

37. The method of claim 35, wherein said step of transmitting, at least indirectly, said encrypted data encryption key to said loader further comprises transmitting, at least indirectly, said encrypted data encryption key to said loader only if said current loader location value is consistent with said loader location value.

38. The method of claim 35, wherein said step of transmitting, at least indirectly, said encrypted data and said encrypted data encryption key to said recipient device further comprises transmitting, at least indirectly, said encrypted data encryption key from said loader to said recipient device only if said current location value is consistent with said customer location value.

39. The method of claim 31, wherein said step using at least a customer location value to apply a first layer of encryption to said data encryption key further comprises using at least a customer location value and a time value to apply a first layer of encryption to said data encryption key, said time value being generated using at least an authorized time for removing said first layer of encryption from said data encryption key.

* * * * *